(12) United States Patent
Riggins et al.

(10) Patent No.: US 7,033,513 B2
(45) Date of Patent: Apr. 25, 2006

(54) METHOD AND APPARATUS FOR FILTERING TAP CHANGER OIL

(75) Inventors: Douglas Riggins, Dallas, TX (US);
Angelynn G. Price, Dallas, TX (US);
John F. Puente, Keller, TX (US)

(73) Assignee: Waukesha Electric Systems, Incorporated, Waukesha, WI (US)

( * ) Notice: Subject to any disclaimer, the term of this patent is extended or adjusted under 35 U.S.C. 154(b) by 312 days.

(21) Appl. No.: 10/464,777

(22) Filed: Jun. 19, 2003

(65) Prior Publication Data

US 2004/0256332 A1  Dec. 23, 2004

(51) Int. Cl.
*B01D 37/00* (2006.01)
(52) U.S. Cl. .............. 210/805; 210/168; 210/172; 210/234; 210/416.5; 210/138
(58) Field of Classification Search ............... 210/767, 210/805, 167, 168, 172, 232, 234, 416.5, 210/138
See application file for complete search history.

(56) References Cited

U.S. PATENT DOCUMENTS

| 2,064,798 | A | * | 12/1936 | Jones ........................ 494/61 |
| 4,210,123 | A | * | 7/1980 | Moore et al. ............ 126/374.1 |
| 2002/0195404 | A1 | * | 12/2002 | Pickens et al. ............. 210/755 |
| 2004/0256332 | A1 | * | 12/2004 | Riggins et al. ............. 210/805 |

* cited by examiner

*Primary Examiner*—Robert James Popovics
(74) *Attorney, Agent, or Firm*—Baker & Hostetler LLP

(57) ABSTRACT

A filter apparatus suitable for electrical substation high-voltage transformer tap changers and similar oil-filled equipment removes moisture and other contaminants from the insulating oil bath in which the tap contacts are immersed. The apparatus can be configured and subsequently reconfigured for use with any of a variety of filter media using a common pump and control mechanism and an assortment of adapters.

16 Claims, 3 Drawing Sheets

METHOD AND APPARATUS FOR FILTERING TAP CHANGER OIL

FIELD OF THE INVENTION

The present invention relates generally to filtration of oil-filled switching apparatus for electrical substations and other high-voltage, high-power applications. More particularly, the invention relates to filtering apparatus and methods for maintaining cleanliness and satisfactory electrical properties in the coolant oil that fills tap changers.

BACKGROUND OF THE INVENTION

It is known in the manufacturing of power distribution apparatus to include automatic transformer tap changing that can adjust the power fed to factories, subdivisions, apartment houses, and other large loads as often as several times a day or more as the load varies. This load variation changes the voltage drop across substantially fixed resistances such as distribution wiring, requiring compensating adjustments in transformer tap connections.

The contact portion of a tap changer is in some embodiments fully immersed in insulating oil for cooling and reduction of arcing. The immersed switching events can nonetheless exhibit some arcing, which tends to break down the oil, leaving contaminating particles. In addition, the tap changer is normally not hermetically sealed, so that there is some opportunity in many systems for water vapor to enter the system, which vapor can be absorbed by the oil, can be entrained as a corrosion promoter, or can otherwise become an active contaminant.

It is further known in the power distribution industry to provide a surplus volume of oil in a reservoir in each unit of the apparatus in order to increase thermal mass and to promote thermal regulation without continuous recourse to pumping. Installation of filters and pumps permits periodic filtering to capture undesirable materials for subsequent removal. Industry has developed a variety of solutions to the power distribution and switching apparatus oil contamination problem. This has lead to diversity in the capabilities of the apparatus that controls such parameters as filtering system run time and run interval, as well as of styles, of filters. In some examples, the filter or the pump may be located inside the apparatus, so that it is necessary to deenergize, drain, and disassemble the apparatus simply to gain access to the pump and/or filter to troubleshoot it; in other examples, filtering resources are limited in capability with respect to the volume of oil in a device requiring filtering.

Accordingly, there is a need in the art for an apparatus and method for adapting pumped filter systems to accept more than one type of filter, as well as further adapting pumped filter systems to operate either in a heavily automated mode or with very detailed user command control.

SUMMARY OF THE INVENTION

The above needs have been met to at least some degree by a novel filter adapter and method as herein described.

In accordance with one embodiment of the present invention, a filter system for filtering oil comprises a pump to draw oil from a reservoir external to the filter system and introduce it into the filter system under pressure; a first fitting directing flow from the pump, where the first fitting is able be disconnected without permitting significant oil leakage under a condition of applied pump pressure; a filter to remove contaminants from the oil urged through it from the first fitting; a second fitting directing flow from the filter, to allow the filter to be disconnected without permitting significant oil leakage under a condition of applied pump pressure; and a return line to return filtered oil to the reservoir from the filter system.

In accordance with another embodiment of the present invention, a filter system for filtering oil comprises means for drawing oil from a reservoir; means for pressurizing oil while allowing it to flow from means for pressurizing; means for directing flow of oil from means for pressurizing; means for capturing contaminants entrained in a flow of oil; and means for directing flow of oil back to a reservoir from which the oil was previously drawn.

In accordance with yet another embodiment of the present invention, a process for filtering a fluid comprises the steps of drawing fluid from a reservoir; pressurizing the drawn fluid using an apparatus for pressurizing; directing the drawn and pressurized fluid to a filtering medium capable of removing contaminants therefrom; passing the drawn and pressurized fluid through the filtering medium so that contaminants are removed; and directing the reduced-contaminant fluid back to the reservoir from which it was initially removed.

There have thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

In a preferred embodiment of the present invention, an oil filtering apparatus and method is provided that allows removal and replacement of a filter without deenergizing, disassembly, or spillage and that permits the non-spilling feature to be retained with other filter styles by using a novel filter adapter. This adapter assembly may be fitted to the filter ports on the pumping system in place of the original style of filter. Like the original style of filter, the adapter assembly actuates moderate-pressure connectors that allow a filter assembly to be removed while its transformer is in use with negligible leakage—typically no more than one or two drops per connecting or disconnecting event. Since the pump can be configured to stop passing oil through the filter for a number of hours per day, there can be ample opportunity to perform periodic maintenance following removal, even without securing pump power. Further, an overpressure bypass can route the oil past the filter in the event that the pump begins to run while the filter assembly is removed.

Once a filter adapter has been removed from the pumping subsystem, it can be disassembled and the filter cartridge removed, typically in a controlled, workshop environment. After any needed cleaning, it can receive a replacement filter cartridge and any desired testing can be performed. Finally, the filter adapter can be reinstalled by mating the two dripless fittings on the pump housing with the corresponding, fittings on the filter adapter. Adding of any needed makeup oil is a separate activity.

An alternate approach employs the maintenance worker's carrying of a spare cartridge assembly per tap changer, permitting a complete round of filter exchanges to be performed in the field, followed by refurbishing and restocking the first set of filter cartridges without needing to make a second trip to each site.

Figure 1:
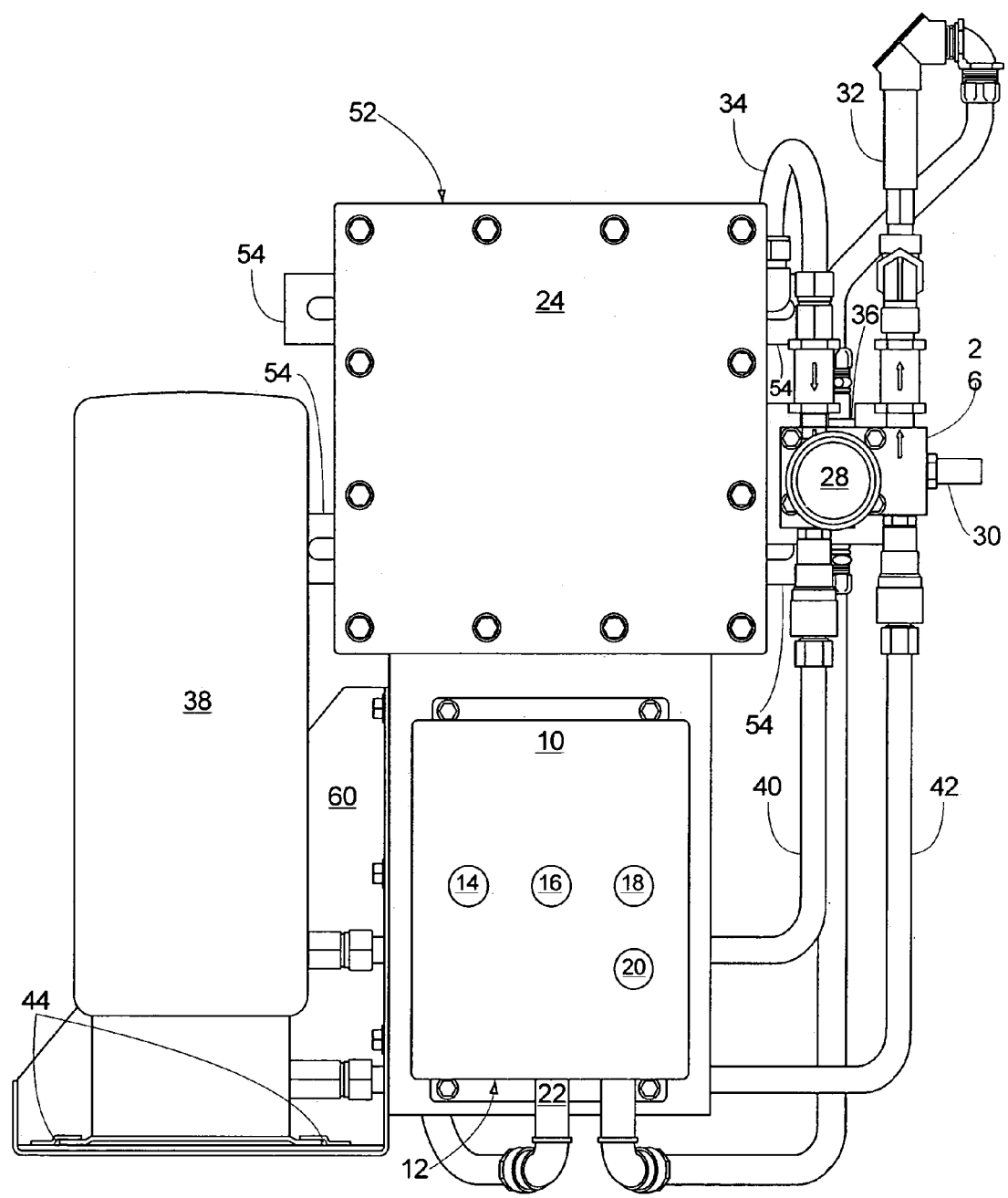
FIG. 1 is a front view of a retrofit filter unit ready to be mounted to a tap changer side wall.

The invention will now be described with particular reference to the drawing figures, in which like reference numerals refer to like parts throughout. FIG. 1 shows a preferred embodiment of an oil filtration system intended as an add-on or retrofit unit, ready to be affixed to a tap changer. An electrical controls case 10 can be fed with alternating current (AC) power through a bottom-feed conduit port 12. The case 10 in the preferred embodiment has three indicator lamps 14, 16, and 18 and a single control 20. Controlled power can be fed out of the electrical controls case 10 via a second conduit port 22 to an electric motor and pump assembly 24. An output from the motor and pump assembly 24 feeds the pressurized oil into a manifold 26 with a pressure gauge 28. The manifold 26 is equipped with an automatic control valve 30 for overpressure bypass, to allow the oil to shunt around a blocked or missing filter 38, and control switches comprising a low pressure sensor 32 to allow the controller to shut down the motor if the oil inlet line 34 pressure drops to an unacceptably low level, such as by blockage, and a high pressure sensor 36 to likewise provide high pressure fault data to the timer circuit to direct shutdown in event of an overpressure not related to a filter blockage.

A filter 38 can be mounted in a suitable location, such as one that provides a compact overall configuration, one that promotes ease of access, one that minimizes plumbing lengths, or in accordance with another criterion. In the preferred embodiment, a distinctly large canister filter 38 with feed lines 40 and 42 near the filter's bottom is installed to the side of the pump 24 opposite the manifold 26, fitted within a slot 44 that retains the filter 38 in its preferred orientation. The flexible feed lines 40 and 42 from the filter 38 in the preferred embodiment are routed behind the control box 10 to the manifold 26, where inlet 44 and outlet 46 fittings plug into mating connectors 48 and 50, respectively, on the manifold 26.

FIG. 1 further shows an oil inlet 52 on the pump 24. This port is plumbed by the user in add-on systems. Mounting tabs 54 allow the unit to be affixed to any convenient location, preferably directly to a face of the tap changer, as by spot welded studs or another method as suited to the application.

Figure 2:
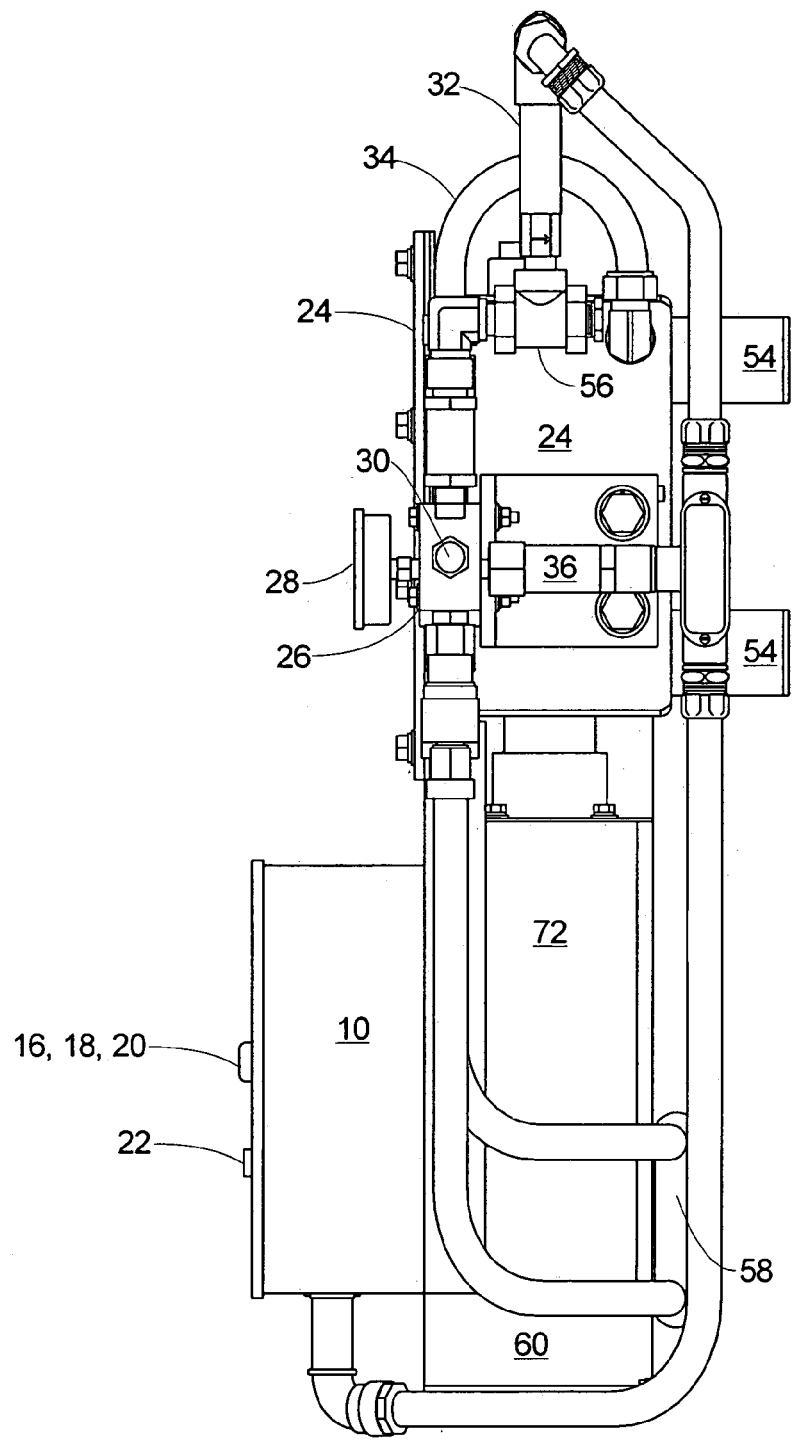
FIG. 2 is a right side view of the retrofit filter unit of FIG. 1.

FIG. 2 is a side view that shows some features blocked in FIG. 1. Return oil flow to the tap changer comes from the manifold 26 by way of a fitting 56. Routing of the feed lines 40 and 42 from the filter 38 to the manifold 26 is shown to pass through a clearance hole 58 in a filter mounting bracket 60, the latter also visible in FIG. 1.

The embodiment shown in FIGS. 1 and 2 is one of several possible embodiments that permit an end user to choose a preferred filter style. The default filter configuration for a similar tap changer oil filter not incorporating the invention uses a more compact, sealed cartridge not suitable for refurbishment. The filter canister 38 shown in the preferred embodiment uses a paper filter element inside, and can be disassembled to replace the element. Alternate embodiments can use other replacement elements, a motor vehicle-style screw-in cartridge attached to a mounting device with the appropriate input and output fittings provided, or a comparable arrangement. For many such embodiments, a unique or generic mounting or support bracket for the filter assembly may be necessary.

The length of the flexible feed lines 40 and 42 between the manifold 26 and the filter 38 is limited by the drop in pressure due to line losses; typically, a well-chosen pump can function with a combination of input and output line lengths between the tap changer and the filter unit, plus the internal flexible line lengths, of roughly 75 feet, without needing to increase line inside diameter beyond the default one-half inch. Under circumstances where system configurations can result in destructive resonances between line structure, fluid dynamic properties of the oil, and the excitative properties of the pump, it may be necessary to select critical line lengths or to use damping devices to permit system operation at all temperatures in unattended systems. A resonance sensor in a fluid line can be added to detect incipient faults under extreme conditions. As noted above, the low-pressure detector can shut down operation in event of a line fracture.

Figure 3:
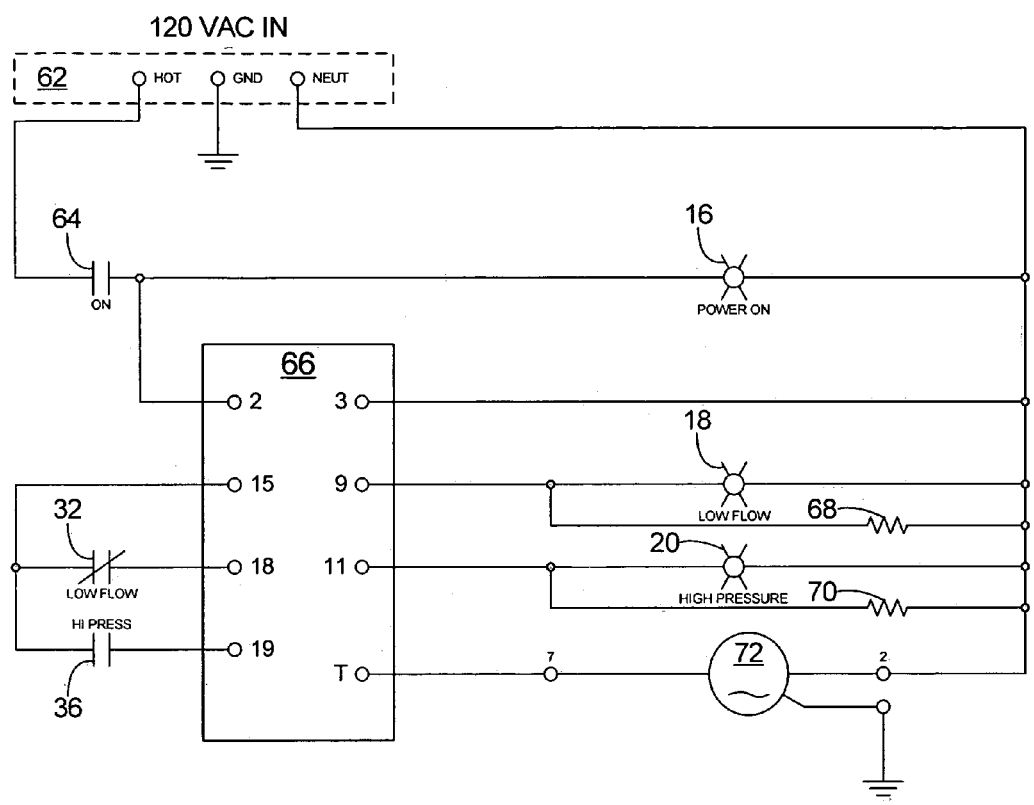
FIG. 3 is a ladder-type schematic diagram of an implementation of the timing and control system within a filter unit.

The ladder diagram in FIG. 3 shows the basic functionality of the control system of a tap changer filter apparatus in accordance with a preferred embodiment. 120 volts alternating current (VAC) input is provided as an input from a user installation to a terminal strip or equivalent termination arrangement 62. A switch element 64 on the control switch 20 applies the 120 VAC to the electronics board 66 at terminal 2. The Power On indicator light 18 is on whenever the switch 22 is set to the ON position. Terminal 3 on the electronics board 66 is the AC return to neutral, completing the primary circuit.

Continuing the description of a representative apparatus in accordance with a preferred embodiment, common terminal 15 on the electronics board 66 feeds sense power to the two external switches labeled LOW FLOW 32 and HI PRESS 36. For the embodiment shown, the low flow switch contacts 32 used in the circuit are normally closed, such as when sitting in the shipping carton. This normal state is the same state that occurs during low flow conditions. The overpressure contacts 36 used in the embodiment are normally open, and close during overpressure conditions. Thus each of the faults completes a circuit, connecting terminal 15 to terminal 18 and terminal 19, respectively, which causes power to be applied to the LOW FLOW 18 and HI PRESS 20 indicators respectively. Each of these indicator circuits is bypassed by a comparatively high-value resistor 68 and 70, respectively, to provide a stable electrical circuit.

Concluding the description of a representative apparatus according with a preferred embodiment, terminal T of the electronics board 66 applies power to an external motor 72, a part of the motor and pump assembly 24, shown in FIGS. 1 and 2.

The content of the electronics board 66 is comprised in large part of circuitry that implements a conventional timing circuit, namely a power supply, clock oscillator, and counters that are controlled by so-called dual-in-line package, or DIP, switches. At the completion of a delay interval, the activation time for the motor occurs and a booster circuit on the board 66 activates a small on-board power relay that drives the motor. No auxiliary relay contacts are shown for customer use in the preferred embodiment, although such a feature would represent a straightforward extension of the concept and would allow remote monitoring of the run cycle without risk of damage to the working components of the system.

The many features and advantages of the invention are apparent from the detailed specification; thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. A filter system for filtering oil from a transformer device, comprising:
   a pump to draw oil from a reservoir external to the filter system and introduce it into the filter system under pressure;
   a first fitting directing flow from said pump, said first fitting able be disconnected without permitting significant oil leakage under a condition of applied pump pressure;
   a filter to remove contaminants from the oil urged through it from said first fitting;
   a second fitting directing flow from said filter, to allow said filter to be disconnected without permitting significant oil leakage under a condition of applied pump pressure; and a return line to return filtered oil to a reservoir external to the filter system,
   wherein the filter system further comprises a motor to power said pump;
   wherein the filter system further comprises a control system to control the time intervals during which said motor powers said pump; and
   wherein the pump, the filter, the motor and the control unit are attached together to form a subassembly; and
   an attaching device for attaching the subassembly to the transformer device to completely support the subassembly on the transformer device.

2. The filter system of claim 1, wherein the filter system further comprises:
   a manifold to direct the oil from an outlet port of said pump through a first path;
   a first fitting directing flow from the first path in said manifold, said first fitting able be disconnected without permitting significant oil leakage under a condition of applied pump pressure; and
   a second fitting directing flow from said filter back through a second path in said manifold, to allow the return line from said filter to be disconnected without permitting significant oil leakage under a condition of applied pump pressure.

3. The filter system of claim 1, wherein the filter system further comprises:
   an adapter housing that uses a specific filter type with said first fitting and said filter system;
   a fitting joined to said adapter housing to mate said first fitting and the filter inlet side of said adapter housing; and
   a fitting joined to said adapter housing to mate said second fitting and the filter outlet side of said adapter housing.

4. The filter system of claim 3, wherein the filter system further comprises an adapter housing that accepts individually a plurality of styles of filter.

5. The filter system of claim 3, wherein the filter system further comprises an adapter housing that accepts a combination of filters simultaneously.

6. The filter system of claim 1, wherein the filter system further comprises:
   a first mating fitting that permits unmating of said adapter housing from said manifold without permitting significant oil leakage under a condition of applied pump pressure; and
   a second mating fitting that permits unmating of said adapter housing from said manifold without permitting significant oil leakage under a condition of applied pump pressure.

7. The filter system of claim 1, wherein the filter system further comprises a sealed filter.

8. The filter system of claim 1, wherein the filter system further comprises a sealed assembly comprising a filter, a first fitting, and a second fitting.

9. The filter system of claim 1, wherein the filter system further comprises:
   a first mating fitting separated from the filter housing by a flexible hose; and
   a second mating fitting separated from the filter housing by a flexible hose.

10. The filter system of claim 1, wherein the filter system further comprises:
    a first mating fitting attached directly and rigidly to the filter housing; and
    a second mating fitting attached directly and rigidly to the filter housing.

11. The filter system of claim 1, wherein the filter system further comprises a first mating fitting attached to the filter housing to permit alignment accommodation.

12. The filter system of claim 1, wherein the filter system further comprises a second mating fitting attached to the filter housing to permit alignment accommodation.

13. A filter system for filtering oil from a transformer device, comprising:
    means for drawing oil from a reservoir;
    means for pressurizing oil while allowing it to flow out of a pressurizing means;
    means for directing flow of oil from said pressurizing means;
    means for capturing contaminants entrained in a flow of oil; and
    means for directing flow of oil back to a reservoir from which the oil was previously drawn;
    means for controlling application of power to said pressurization means;
    means for establishing time intervals of application and of withholding of power to said pressurization means;

wherein the pressurizing means, the capturing means, the controlling means, and the time establishing means are attached together to form a subassembly; and means for attaching the subassembly to the transformer device to completely support the subassembly on the transformer device.

14. The filter system of claim 13, further comprising:
means for disconnecting flow of oil to said contaminant capture means under a condition of pressure and rate of flow; and
means for disconnecting flow of oil from said contaminant capture means under a condition of pressure and rate of flow.

15. The filter system of claim 13, further comprising:
means for integrating a specific contamination capture means into an oil flow directing means; and
means for interfacing said integrated contamination capture and flow directing means into an operational filter system.

16. A method of mounting a filter system for filtering oil from a transformer device, comprising:
providing a subassembly having;
a pump to draw oil from a reservoir external to the filter system and introduce it into the filter system under pressure;
a first fitting directing flow from said pump, said first fitting able be disconnected without permitting significant oil leakage under a condition of applied pump pressure;
a filter to remove contaminants from the oil urged through it from said first fitting;
a second fitting directing flow from said filter, to allow said filter to be disconnected without permitting significant oil leakage under a condition of applied pump pressure; and
a return line to return filtered oil to a reservoir external to the filter system,
wherein the filter system further comprises a motor to power said pump;
wherein the filter system further comprises a control system to control the time intervals during which said motor powers said pump; and
wherein the pump, the filter, the motor and the control unit are attached together to form a subassembly; and
attaching the subassembly unit to the transformer device to completely support the subassembly on the transformer device.

* * * * *